United States Patent
Fox

[11] 3,717,129
[45] Feb. 20, 1973

[54] METHOD AND APPARATUS FOR REDUCING ENGINE EXHAUST POLLUTANTS

[75] Inventor: Homer M. Fox, Bartlesville, Okla.
[73] Assignee: Phillips Petroleum Company
[22] Filed: Sept. 28, 1970
[21] Appl. No.: 76,099

[52] U.S. Cl. ............... 123/1 A, 60/39.05, 60/39.06, 60/39.53, 123/25 R, 123/119 E, 123/121
[51] Int. Cl. ........................ F02d 19/00, F02c 7/22
[58] Field of Search ..123/1, 1 A, 27 GE, 121, 119 E, 123/25; 60/31, 39.02, 39.05, 39.06, 39.59, 39.53

[56] References Cited

UNITED STATES PATENTS

| | | | |
|---|---|---|---|
| 3,167,913 | 2/1965 | Muhlberg et al. | 60/39.02 |
| 2,201,965 | 5/1940 | Cook | 60/31 UX |
| 2,086,775 | 7/1937 | Lyons et al. | 123/1 A X |
| 1,717,767 | 6/1929 | Diaz | 60/31 UX |
| 2,645,906 | 7/1953 | Ryan | 123/121 X |
| 2,767,691 | 10/1956 | Mengelkamp et al. | 123/1 |
| 3,406,666 | 10/1968 | Steiger | 123/27 GE |

*Primary Examiner*—Al Lawrence Smith
*Attorney*—Young and Quigg

[57] ABSTRACT

This invention resides in passing exhaust gases from an engine through a fuel regenerator in indirect heat exchange with fuel and steam in contact with a catalytic bed for steam reforming the fuel, bringing the reformed fuel into heat exchange relationship with the fuel and water entering the fuel regenerator and thereafter operating the engine utilizing this reformed fuel for lowering the amount of pollutant species discharging from the engine.

10 Claims, 1 Drawing Figure

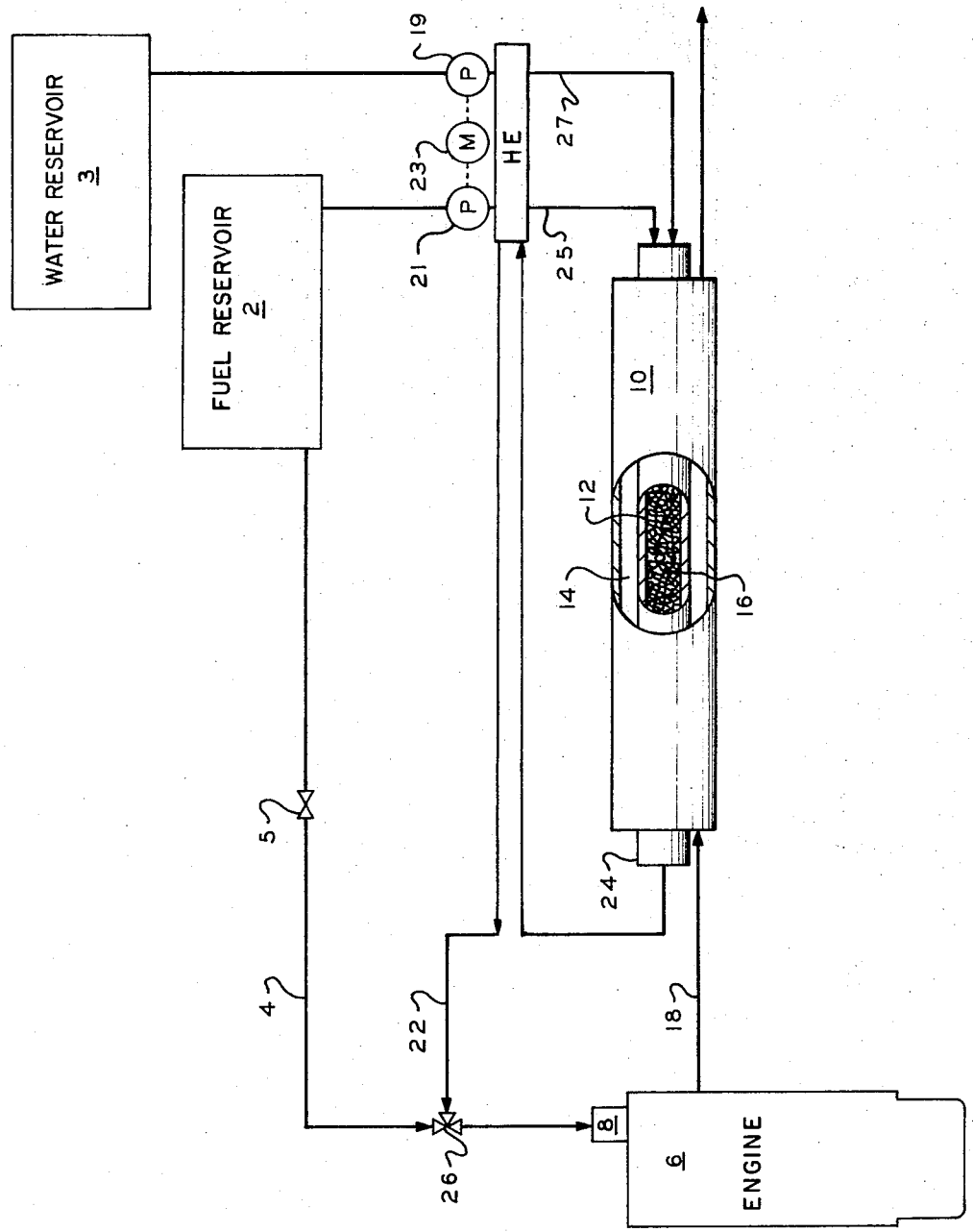

METHOD AND APPARATUS FOR REDUCING ENGINE EXHAUST POLLUTANTS

It is desired to provide an apparatus and a method for reducing the pollutants discharging from the exhaust of an internal combustion engine.

This invention therefore resides in a method and apparatus for passing water and a liquid hydrocarbon fuel for an engine through a catalytic bed, increasing the temperature of the fuel in contact with the catalytic bed by indirect heat exchange with exhaust gases from the engine, steam-reforming the fuel, and thereafter passing the reformed fuel to the engine for operating the engine with reduced pollutants in the exhaust of said engine.

It is therefore an object of this invention to provide a method and apparatus for forming a higher energy fuel and thereafter operating the engine while reducing the amount of pollutant material in the exhaust discharging from said engine.

Other aspects, objects, and advantages of the present invention will become apparent from a study of the disclosure, the appended claims, and the drawing.

The drawing is a diagrammatic view of the apparatus of this invention. Referring to the drawing, a stream of first hydrocarbon liquid fuel is discharged from a fuel reservoir 2 through conduit 4 and into the combustion chamber (not shown) of an engine via a fuel injection apparatus 8 of the engine 6.

A fuel regenerator tube 10 is associated with the exhaust of the engine 6. The fuel regenerator tube 10 has separate first and second chambers 12,14 extending therethrough with openings formed on the ends thereof in communication with said chambers 12,14. The catalytic bed 16 is formed in the first chamber 12 of the fuel regenerator tube 10.

A conduit 18 is connected to the combustion chamber of the engine 6 and the second chamber 14 of the fuel regenerator tube 10 for passing exhaust gases from the engine 6 through the second chamber 14 of the fuel regenerator tube 10 in indirect heat exchange with the catalytic bed 16 in the first chamber 12 of the fuel regenerator tube 10.

Liquid proportioning means, such as positive displacement gear pumps 19 and 21, communicate with water reservoir 3 and liquid hydrocarbon fuel reservoir 2, respectively. The proportioning pumps are operated by a common drive from motor 23. Pumps 19 and 21 are adjusted to maintain proportions of water and hydrocarbon which are suitable for the steam reforming reaction. Ordinarily, a weight ratio of water to hydrocarbon of about 1.2 or higher is satisfactory. The outlets of pumps 19 and 21 are connected to one end of the first chamber 12 of the fuel regenerator 10. The water and fuel are preferably charged into an end of the fuel regenerator tube 10 opposed to the end thereof at which the exhaust gases enter the second chamber 14. A conduit 22 is attached to the opposed end of the first chamber 12 of the fuel regenerator tube 10 and to fuel injection apparatus 8 for delivering a regenerator fuel from the first chamber 12 into the combustion chamber of the engine 6. A pressure regulator 24 such as, for example, a constant pressure inlet valve located at the exit end of chamber 12.

If desired, conduit 22, through which pass hot reformer products, can be placed in heat exchange relationship (not shown) with conduits 25 and 27 in order to preheat the reactants for the steam-reforming reaction within catalytic bed 16.

Similarly, a condenser (not shown) can be located in conduit 22 in order to condense out a portion of the water in the reformate-containing stream, particularly when high water:hydrocarbon ratios are used in catalyst bed 16.

The pressure regulator 24 is associated with the first chamber 12 for maintaining the pressure therein at or above a preselected level such as, for example, at least 2 atmospheres. A valve 26 is also connected to the conduits 4 and 22 and to the fuel injection apparatus for selectively controlling the flow of fluids into the combustion chamber of the engine 6.

In order to improve the efficiency of the fuel regenerator tube 10 of this apparatus it is preferred that insulating material cover said regenerator tube 10 and conduit 18. The volume of catalyst in the catalytic zone will be such as to provide a gaseous hourly space velocity in the range of from about 500 to about 40,000 gaseous volumes of fuel and steam per volume of catalyst per hour.

The catalytic bed 16 of the first chamber 12 of the fuel injector 10 contains a suitable steam reforming catalyst and is preferably formed of nickel or cobalt and can include other materials such as, for example, oxides of aluminum, chromium, cerium, zirconium, calcium, and the like as known in the art. A particularly preferred catalyst is a calcium aluminate-nickel catalyst, containing about 20 weight percent nickel, which has been modified by incorporation of about 5 weight percent of a barium salt such as barium acetate. The catalytic bed 16 can also be formed of other materials known in the art so long as said catalytic bed will function at the temperatures of the particular exhaust system to steam reform the fuel supplied thereto and form a second fuel that will combust within the engine and form resultant exhaust gases having a lower volume of pollutant materials relative to the exhaust gases of the fuel prior to regeneration in the apparatus of this invention.

In the method of this invention, a first hydrocarbon liquid fuel such as, for example, diesel fuel, gasoline, jet fuel, kerosene or liquefied petroleum gas is delivered from the fuel reservoir 2 through line 4 to the fuel injector 8 for injection into the engine 6 for operation of said engine 6. The operation of the engine 6 is continued until the temperature of the exhaust discharging from the combustion chamber of the engine 6 increases to a temperature sufficient (to be later described).

Volumes of the first fuel and water are thereafter metered into the first chamber 12 of the fuel regenerator tube 10 by the proportioning pumps 19 and 21 and contacted with the catalyst bed of said first chamber 12 in indirect heat exchange with exhaust gases discharging from the engine 6 and passing through the second chamber 14 of the fuel regenerator tube 10. The pressure within the first chamber 12 of the fuel injector 8 is maintained at a preselected pressure during injection of fuel and water thereinto by the pressure regulator 24.

The fuel and water mixture is maintained in contact with the catalytic bed 16 for a time sufficient for heating the mixture to a temperature and time sufficient for reforming the first fuel mixture in the presence of the catalyst and producing a second reformed fuel having decreased pollutant properties when combusted. The second reformed fuel is thereafter delivered to the fuel injector 8 of the engine 6 at which air is mixed with the second fuel and the resultant mixture is injected into the engine 6 and combusted. The volume of first fuel injected into the engine 6 is thereafter reduced and preferably terminated by, for example, closing a valve 5 positioned in line 4, and the engine is operated by combusting the second reformed fuel thereby decreasing the rate of discharge pollutants while operating the engine.

The temperature of the exhaust gases passing through the fuel regenerator 10 adjacent the catalytic bed 16 should be at least 950°F before the fuel and water is injected into the catalytic bed. As known in the art, the temperature necessary to sufficiently reform fuel in the catalytic bed depends upon the type of catalyst and fuel and the volumes of materials injected into the bed 16. However, these temperatures for different fuels and catalysts can easily be determined by one skilled in the art.

In order to reduce the pollutants discharging from the engine during operation thereof, it is preferred that the second reform fuel be produced at a rate such that delivery of the second fuel to the engine is at a rate sufficient to operate the engine at the desired speed and load whereby delivery of the first fuel to the engine 6 can be terminated.

In the steam reformation of carbonaceous material utilized in this invention, the engine fuel is upgraded. Using methane as a simple example, the stoichiometric combustion of methane produces only about 123 kcal/mol of consumed methane, whereas a stoichiometric combustion of methane reformate by the method of this invention, namely the mixture of carbon monoxide and hydrogen, produces about 173 kcal/mol of original methane. This represents an increase of approximately 40 percent energy from that available in the original fuel. Moreover, the reform fuel is a better fuel, performs better in the engine, and produces less objectionable exhaust species or pollutants.

In an example of the invention, the fuel used is isooctane. It is to be understood, however, that any conventional liquid or gaseous hydrocarbon can be used including those which are presently considered conventional in such engines. In addition, the invention process is applicable to other heat engines as well as including the broad categories of diesel and turbine engines. The invention process is also suitable not only for the large stationary engines but for engines in vehicles as well.

At a stoichiometric fuel/air ratio, the combustion of a typical internal combustion engine is about 4,200° R. At the end of the expansion stroke it is about 3,300° R and assuming a 300° drop for protection of the exhaust valve and valve seat, the useful exhaust temperature is about 3,000° R. This is a sufficiently high temperature to carry out the chemical conversion involved in this invention.

To illustrate the thermodynamics involved in the process, the conversion of isooctane at 1,450° R is considered. At 1,450° R the equilibrium conversion of the hydrocarbon to reformer products is about 70 percent. Depending upon the specific catalysts and the specific temperatures which might be used, the hydrocarbon conversion can be even higher. However, it has arbitrarily been chosen to demonstrate the effectiveness of the invention even at this level of conversion. The steam reforming reaction for such a system would thus be as follows:

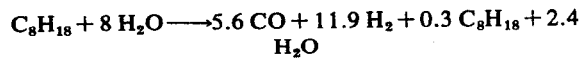
$$C_8H_{18} + 8\ H_2O \longrightarrow 5.6\ CO + 11.9\ H_2 + 0.3\ C_8H_{18} + 2.4\ H_2O$$

The hydrocarbon $C_8H_{18}$ which appears in the products is assumed to be isooctane since the carbon and hydrogen would appear in about such a ratio. The heat energy required to carry out the reaction above is about 275.1 kcal/mol of isooctane. To this must be added the heat energy necessary to vaporize and to heat both the isooctane and the water to 1,450° R. Thus, the total amount of heat energy which is required to carry out the reforming of isooctane and which must be extracted from the exhaust gases is about 485.9 kcal per mol of isooctane. The exhaust gas stream of such an engine does, in reality, contain adequate heat energy for this purpose. After extracting the 485.9 kcal required for the reforming reaction, the temperature of 3,000° R of this exhaust stream is reduced to only 1,751° R which is substantially higher than the 1,450° R required, actually containing an amount of energy which is more than 10 percent in excess of that required. This excess is adequate for what might be expected in normal heat losses.

The stoichiometric combustion of the reformed fuel under the conditions described above is shown in the following chemical equation:

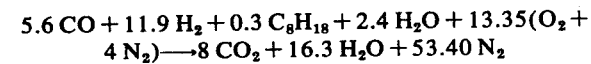
$$5.6\ CO + 11.9\ H_2 + 0.3\ C_8H_{18} + 2.4\ H_2O + 13.35(O_2 + 4\ N_2) \longrightarrow 8\ CO_2 + 16.3\ H_2O + 53.40\ N_2$$

The heat energy produced by the combustion according to the above equation is 1,514 kcal/mol of the original isooctane. On the other hand, the heat energy produced by the combustion of the non-reformed isooctane, as shown in the following equation

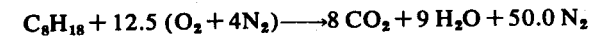
$$C_8H_{18} + 12.5\ (O_2 + 4N_2) \longrightarrow 8\ CO_2 + 9\ H_2O + 50.0\ N_2$$

is only about 1215.7 kcal/mol of isooctane. Thus on a pound/mol basis for the fuel, 2,156 pounds of combustion products at 3,000° R are obtained. The energy in this exhaust charge is about 1,267 btu per pound. The non-reformed combustion produces 1,914 pounds of hot exhaust products which contain only about 1,150 btu per pound. Thus one advantage of the regenerator process of this invention is to produce about 24 percent more work from the isooctane fuel. The water is considered at no cost and the pumping energy required to pump the water and fuel to the operating pressure of the regenerator is considered to be extremely small. The power required to drive a pump for bringing the water and fuel to regenerator pressure would be more than offset by the supercharging and thermal regeneration achieved by injecting a fuel mixture into the cylinder during the compression stroke.

More importantly, the hydrocarbon emissions from an engine operating on a partially or completely reformed hydrocarbon fuel are substantially reduced and offer a significant improvement in the area of smog reduction. Examples of exhaust pollutant reduction between a first fuel and a second reformed fuel of this invention are as follows:

EXAMPLE

Using a valve-in-head, single cylinder, CFR engine (see ASTM Motor and Research Methods for Rating Fuels, 5th Edition, 170–173, 1964) together with appropriate temperature and spark timing controls, a conventional gasoline fuel and a synthetic normal hexane steam-reformate were compared in regard to fuel consumption and exhaust emissions. Data were obtained at engine conditions of 1,000 RPM, 8.00 compression ratio, maximum power spark timing, 125°F fuel mixture temperature, 149°F coolant temperature, over varying throttle settings, and fuel-air mixtures. The data were translated into average fuel consumption and exhaust emissions in terms of a 4,000-lb. vehicle with a typical engine and automatic transmission on a test schedule representing the accelerations, decelerations, idle, and cruise of an eight mile trip through Los Angeles traffic (D. M. Teaque, "Los Angeles Traffic Pattern Survey", Vehicle Emissions, SAE Technical Progress Series 6 17 Macmillan Co., 1964).

The weighted average emissions and the fuel consumption for the reformate fuel is shown in the following table. The table also shows the results for conventional gasoline which was also run under the same conditions and on the same basis.

|  | Reformate Fuel | Gasoline |
| --- | --- | --- |
| Carbon Monoxide, g/IHP-Hr[2] | 0.8 | 47.5 |
| Hydrocarbons, g/IHP-Hr | 0 | 3.8 |
| Nitric Oxide g/IHP-Hr | 0.9 | 6.8 |
| ISFC[1], Lbs/IHP-Hr | 0.390[3] | 0.449 |

[1] Indicated specific fuel consumption
[2] Indicated Horsepower-Hour.
[3] Lbs hexane, assuming 100% conversion to reformed product The above data show the dramatic improvement in exhaust emissions which is obtainable with the process of the present invention. The data for both fuels were obtained with maximum use of optimum spark timings and of homogeneous, lean, fuel-air mixtures. Departing from such controlled conditions may possibly modify the results, but in any event, the improvements are substantial.

The hexane reformate fuel used in the tests had the following composition, in mol percent:

| Methane | 35.3 |
| --- | --- |
| Hydrogen | 30.0 |
| Carbon monoxide | 3.3 |
| Carbon dioxide | 16.4 |
| Water | 15.0 |

The above composition is typical of an equilibrium product of steam reacted with hexane at 1,000°F and using a steam:hexane ratio of 1.71 lb/lb with a water condenser operating at 180°F to condense out a portion of the water content of the effluent.

Other modifications and alterations of this invention will become apparent to those skilled in the art from the foregoing discussion, example, and accompanying drawing, and it should be understood that this invention is not to be unduly limited thereto.

What is claimed is:

1. A method for reducing the exhaust pollutants discharging from an engine comprising:

delivering a first hydrocarbon fuel to the engine for operating the engine;

continuing to operate the engine until the exhaust temperature discharging from the engine increases to a preselected temperature;

metering into and mixing volumes of the first fuel and water in a catalyst bed that is in indirect heat exchange with exhaust gases discharging from the engine;

maintaining the first fuel and water mixture in contact with the catalytic bed for a time sufficient for heating the mixture to a temperature and for a time sufficient for reforming the first fuel mixture in the presence of the catalyst and producing a second reformed fuel having decreased pollutant properties when combusted;

passing the second reformed fuel into heat exchange relationship with the first fuel and water being metered into the catalyst bed for increasing the temperature of said first fuel and water;

passing the second fuel to a fuel injection apparatus of the engine;

mixing a volume of air with the second reformed fuel;

delivering the second reformed fuel and air mixture into the engine;

at least reducing the volume of first fuel delivered to the engine; and combusting the second reformed fuel in the engine for operating said engine at reduced pollutant rates.

2. A method, as set forth in claim 1, wherein the temperature of the exhaust gases passing through the fuel regenerator adjacent the catalyst bed is maintained at a temperature of at least 950°F while the second fuel is injected into the catalytic bed.

3. A method, as set forth in claim 1, wherein the catalyst utilized is selected from a group comprising nickel and cobalt.

4. A method, as set forth in claim 3, wherein the catalyst includes materials selected from the group consisting of oxides of aluminum, chromium, cerium, zirconium and calcium.

5. A method, as set forth in claim 1, wherein the first hydrocarbon liquid fuel is selected from the group consisting of gasoline, diesel, jet fuel, kerosene and liquefied petroleum gas.

6. A method, as set forth in claim 1, wherein the second reformed fuel is produced at a rate such that delivery of the second fuel to the engine is at a rate sufficient to operate the engine at the desired speed and including terminating the flow of first fuel to the engine.

7. A method, as set forth in claim 1, wherein the temperature of the exhaust gas adjacent the catalytic bed is maintained at a temperature of at least 950°F during injection of fuel and water into the catalytic bed;

the catalytic bed is selected from a group comprising nickel and cobalt;

the first fuel is liquefied petroleum gas; and the pressure within the catalyst bed is maintained at pressures greater than about 2 atmospheres.

8. An apparatus for reducing the exhaust pollutants discharging from an engine comprising:

means for delivering a stream of first hydrocarbon liquid fuel into a combustion chamber of the engine;

a fuel regenerator tube having separate first and second chambers extending therethrough and having openings formed on the ends thereof in communication with said chambers with said regenerator having a catalytic bed in the first chamber;

a conduit connected to the combustion chamber of the engine and the second chamber of the fuel regenerator tube for passing exhaust gases from the engine through the second chamber of the fuel regenerator tube in indirect heat exchange with the catalyst in the first chamber of said fuel regenerator tube;

means for metering a stream of first hydrocarbon liquid fuel and a stream of water into one end of the first chamber of the fuel regenerator tube each at a preselected rate;

means for maintaining the pressure in the first chamber of the fuel regenerator at a preselected pressure;

means for delivering a resultant second fuel from the other end of the first chamber into heat exchange with the metered fuel and water stream and into the combustion chamber of the engine; and valve means for terminating the flow of the stream of first hydrocarbon liquid fuel into the combustion chamber of the engine.

9. An apparatus, as set forth in claim 8, including insulating material covering the fuel regenerator.

10. An apparatus, as set forth in claim 9, wherein the catalyst is selected from the group comprising nickel and cobalt.

* * * * *